April 2, 1940.  W. J. SMITH  2,196,126
AUTOMATIC BRAKE APPARATUS
Filed Jan. 23, 1939
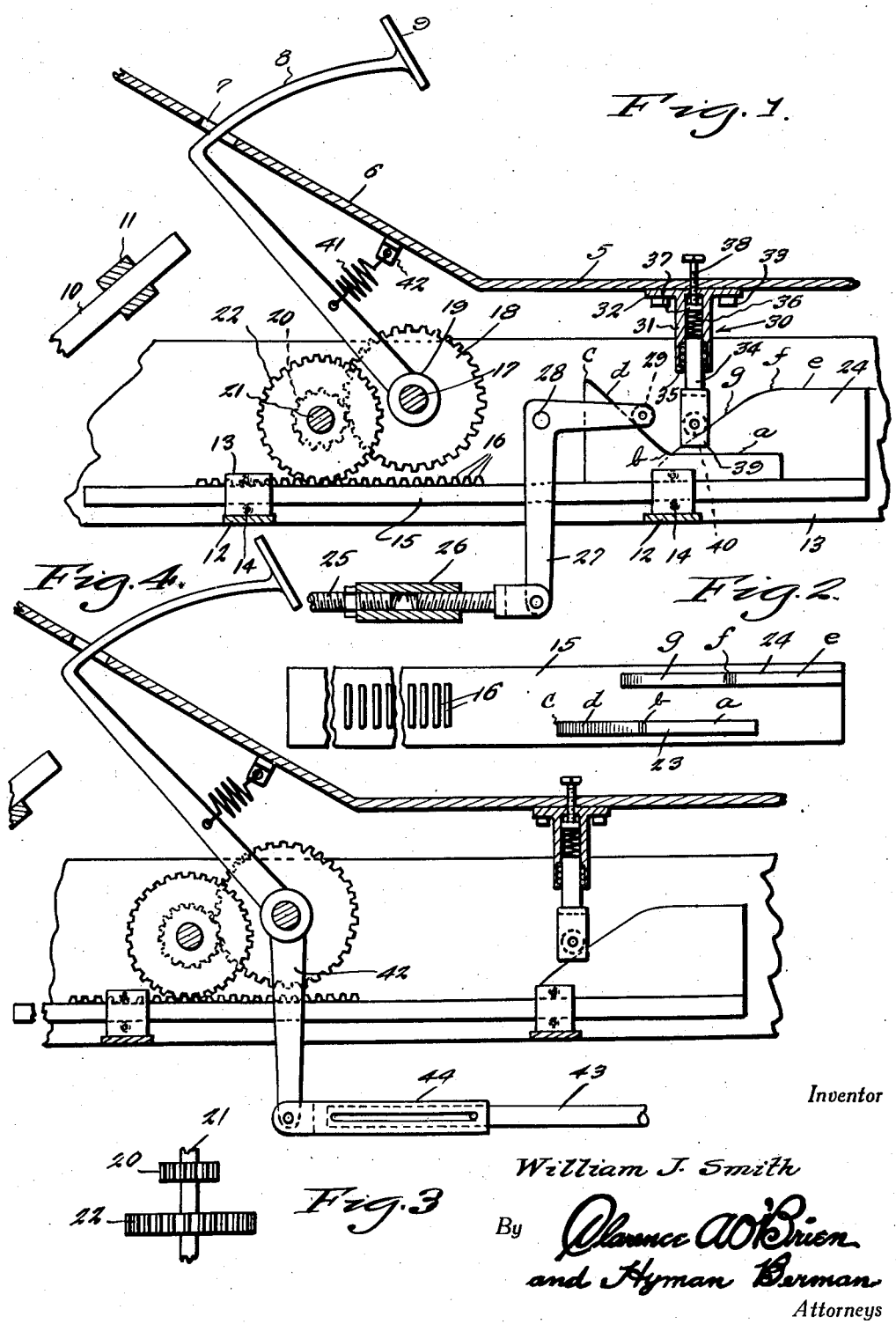
Inventor
William J. Smith
By Clarence A. O'Brien
and Hyman Berman
Attorneys Patented Apr. 2, 1940

2,196,126

UNITED STATES PATENT OFFICE 2,196,126

AUTOMATIC BRAKE APPARATUS

William J. Smith, Delaware City, Del.

Application January 23, 1939, Serial No. 252,488

17 Claims. (Cl. 188—167)

The present invention relates to new and useful improvements in brakes, the principal object being to provide a brake apparatus adapted to operate automatically upon de-celeration of the usual accelerator control of a motor vehicle.

Another important object of the invention is to provide an automatic brake apparatus for motor vehicles wherein the usual foot pedal, conventionally used for service brake actuation is employed in a reverse manner, in that when force is applied thereto, the accelerator mechanism is actuated and the brake mechanism entirely released, while on the other hand, when pressure is relieved from the pedal the brake mechanism is automatically actuated.

Other objects and advantages of the invention will become apparent to the reader of the following specification.

In the drawing:

Figure 1 represents a fragmentary vertical sectional view through the floor and toe boards of a vehicle structure showing the mechanism principally in side elevation.

Figure 2 is a fragmentary top plan view of the rack and cams assembly.

Figure 3 is a fragmentary top plan view showing the gear and pinion unit.

Figure 4 is a view similar to that of Figure 1 showing a slightly modified form of the invention.

Referring to the drawing wherein like numerals designate like parts, it can be seen that numeral 5 represents the usual vehicle floor board and numeral 6 the toe board, the latter having the opening 7 therein for accommodating the upper portion of the foot pedal arm 8 which has the foot plate 9 at its upper end.

Underlying the lower portion of the arm 8 is the depressible rod or plunger 10 operative through the guide 11 for actuating the usual accelerator mechanism (not shown) when depressed. This plunger 10 is on a vertical plane with the lower portion of the arm 8 so that the arm when depressed by foot pressure will contact and urge the plunger 10 downwardly to accelerator operating position.

In carrying out the present invention brackets or the like 12 are secured in position to project laterally from the usual chassis frame 13 and on each of these brackets 12 is a guideway 13 in which rollers 14 are mounted in vertically spaced relation and between these rollers of each guideway structure is slidably disposed the rack bar 15 which at its forward portion is provided with upstanding rack teeth 16.

On the stub shaft 17 is a gear 18 to the hub 19 of which is secured the lower portion of the foot pedal arm 8.

This gear 18 meshes with the pinion 20 which is secured to the rotatable shaft 21, and also secured to the shaft 21 is the gear 22, the latter meshing with the rack teeth 16.

Adjacent the rear end portion of the rack bar 15 are the upstanding web-like cam structures 23 and 24. These cam structures 23 and 24 are in transversely spaced relation, the cam structure 23 being located more forwardly than the cam 24.

The cam 23 has the straight top edge portion $a$ extending to the point $b$ from where this edge portion slants upwardly to the peak $c$, thus defining the cam surface $d$.

The cam 24 has the straight top edge portion $e$ which extends forwardly to the point $f$ from where it declines to meet the rack bar 15, thus defining the cam surface $g$ which intersects the point $b$ of the cam structure 23 on a vertical plane extending transversely of the bar 15.

Numeral 25 denotes the brake operating line which may have a turnbuckle adjustment 26 therein and this is connected to the lower end of the bellcrank 27, pivotally supported as at 28.

The upper arm of this bellcrank is equipped with a roller 29 which rides the cam surface $d$.

The means for effecting automatic operation of the brake mechanism is generally referred to by numeral 30 and consists of a barrel 31 which can be secured by flanges 32 and bolts or screws 33 to the bottom side of the floor board 5 or elsewhere. A plunger 34 is slidable into the lower portion of this barrel 31 and suitable bearing means 35 can be provided in the lower portion of the barrel to act on the plunger 34.

The force means for the plunger 34 consists of the coiled compressible spring 36, which is located in the barrel 31 and interposed between the plunger 34 and the follower plate 37 against which can be driven the adjusting screw 38 to effect proper adjustment of the compression that the spring is to exert on the plunger 34.

A fork 39 is provided at the lower end of the plunger 34 and carries therein a roller 40 which rides on the cam surface $g$. It can be seen that with the lower portion of the fork 39 straddling the cam structure 24 there is no likelihood of the roller becoming displaced from the cam surface $g$.

A coiled tensile spring 41 is connected between the lower portion of the arm 8 and the bracket 42 on the bottom side of the toe board 6.

In the operation of this mechanism, it can be that the pedal arm 8 is forced downwardly under foot pressure against the plunger 10 to manipulate the accelerator mechanism (not shown). This operation of the accelerator mechanism takes place while the brake mechanism is ineffective due to the fact that the roller 40 is on the straight portion e of the cam 24 and roller 29 on the horizontal portion a of the cam 23.

Assume now that the driver wishes to apply the brakes. If he wishes to stop suddenly he can relieve his foot pressure suddenly on the pedal plate 9 or he can gradually release the pressure depending upon the suddenness with which he desires to stop the vehicle. As pressure is released on the foot pedal it will be observed that the spring 41 will act to lift the arm 8, and this is necessary for the reason that the roller 40 is located on the straight portion e of the cam 24 and has little or no effect on the cam surface g. However, the recoil effect of the spring 41 will serve to rotate the gear 18 and this will result in the rotation of the pinion 20 and gear 22. The action of the gear 22 on the rack bar 15 will serve to move the rack bar 15 rearwardly until the roller 40 is located at a position on the cam surface g below the point f where the unit 30 will start taking effect. The roller 40 in pressing downwardly on the cam surface 9 will urge the cam plate 24 rearwardly and cause riding of the cam surface d against the roller 29 of the bellcrank 27 with the result that the bellcrank is swung and a pull is exerted on the brake line 25 with the result that the brake mechanism is operated.

The construction shown in Figure 4 is only slightly different from the form of the invention shown in Figure 1 in that the bellcrank 27, cam 23 and pivot 28 are eliminated and in lieu thereof, an arm 43 depends from the hub 19 of the gear 18 and is connected to the brake line 43 through a slip connection 44. The operation is substantially the same with the exception that the arm 42 is directly carried by the gear 18, brake line getting its actuating force immediately from the rotation of the gear 18.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A brake control comprising a manuallly operated member, brake operating means, drive means adapted to effect operation of the brake operating means upon relief of force from the manually operated member, said drive means including a slide, a cam on the slide, and force applying means operative against the cam.

2. A brake control comprising a manually operated member, brake operating means, drive means adapted to effect operation of the brake operating means upon relief of force from the manually operated member, said drive means including a slide, a cam on the slide, force applying means operative against the cam, said force applying means consisting of a plunger having a roller operative against the cam and spring means exerting force against the plunger.

3. A brake control comprising a manually operated member, brake operating means, drive means adapted to effect operation of the brake operating means upon relief of force from the manually operated member, said drive means including a slide, a cam on the slide, force applying means operative against the cam, said force applying means consisting of a plunger having a roller operative against the cam and spring means exerting force against the plunger, a fork adapted to ride the cam and in which the roller is mounted.

4. A brake control comprising a manually operated member, brake operating means, drive means adapted to effect operation of the brake operating means upon relief of force from the manually operated member, said drive means including a slide, a cam on the slide, force applying means operative against the cam, said force applying means consisting of a plunger having a roller operative against the cam and spring means exerting force against the plunger, and adjusting means for the spring.

5. A brake control comprising a manually operated member, brake operating means, drive means adapted to effect operation of the brake operating means upon relief of force from the manually operated member, said drive means consisting of a slide, a cam on the slide, force applying means operative against the cam, a second cam on the slide, said second cam being adapted to operate the brake operating means.

6. A brake control comprising a manually operated member, a cam, a connection between the cam and the manually operated member, force applying means adapted to apply force against the cam to move the cam and connecting means to a brake applied position, and brake operating means adapted to be operated by movement of the said cam, said connection provided with a second cam thereon, a bellcrank having one arm connected to the brake operating means and its other arm riding the second cam.

7. A brake control comprising a manually operated member, a slide operated by the manually operated member, force applying means associated with the slide for moving the slide in one direction upon release of pressure on the manually operated member, and brake operating means adapted to be operated by actuation of the slide in response to the force applying means.

8. A brake control comprising a manually operated member, a slide operated by the manually operated member, force applying means associated with the slide for moving the slide in one direction upon release of pressure on the manually operated member, and brake operating means adapted to be operated by actuation of the slide in response to the force applying means, said force applying means consisting of a cam and a force exerting rider operative against the cam.

9. A brake control comprising a manually operated member, a slide operated by the manually operated member, force applying means associated with the slide for moving the slide in one direction upon release of pressure on the manually operated member, and brake operating means adapted to be operated by actuation of the slide in response to the force applying means, said force applying means consisting of a cam and a force exerting rider operative against the cam, said cam having a straight extension substantially parallel to the slide and against which the rider can move, and spring means associated with the manually operated member for initially moving the slide to position the cam in force effecting position with respect to the rider.

10. A brake control comprising a manually operated member, a slide operated by the manually operated member, force applying means associated with the slide for moving the slide in one direction upon release of pressure of the manually operated member, and brake operating means adapted to be operated by actuation of the slide in response to the force applying means, said force applying means consisting of a cam and a force exerting rider operative against the cam, said cam having a straight extension substantially parallel to the slide and against which the rider can move, and spring means associated with the manually operated member for initially moving the slide to position the cam in force effecting position with respect to the rider, an arm extending from the manually operated member and connected with the brake operating means.

11. A brake control comprising a manually operated member, a slide operated by the manually operated member, force applying means associated with the slide for moving the slide in one direction upon release of pressure of the manually operated member, and brake operating means adapted to be operated by actuation of the slide in response to the force applying means, said force applying means consisting of a cam and a force exerting rider operative against the cam, said cam having a straight extension substantially parallel to the slide and against which the rider can move, and spring means associated with the manually operated member for initially moving the slide to position the cam in force effecting position with respect to the rider, a second cam on the slide and means between the brake operating means and the second cam for operating the said brake operating means.

12. A brake control comprising a manually operated member, a slide operated by the manually operated member, force applying means associated with the slide for moving the slide in one direction upon release of pressure of the manually operated member, and brake operating means adapted to be operated by actuation of the slide in response to the force applying means, said force applying means consisting of a cam and a force exerting rider operative against the cam, said cam having a straight extension substantially parallel to the slide and against which the rider can move, and spring means associated with the manually operated member for initially moving the slide to position the cam in force effecting position with respect to the rider, a second cam on the slide and means between the brake operating means and the second cam for operating the said brake operating means, said means between the cam and the brake operating means consisting of a bellcrank having one arm connected to the brake operating means and the other arm riding the second cam.

13. A brake control comprising a manually operated member, brake operating means, a slide, gear means between the manually operated member and the slide, and force applying means engaged with the slide to cause movement of the slide in one direction to operate the brake operating means when force on the manually operated member is removed.

14. A brake control comprising a manually operated member, brake operating means, a slide, speed changing means between the manually operated member and the slide, and force applying means engaged with the slide to cause movement of the slide in one direction to operate the brake operating means when force on the manually operated member is removed.

15. A brake control comprising a manually operated member, a slide operated by the manually operated member, force applying means associated with the slide for moving the slide in one direction upon release of pressure on the manually operated member, and brake operating means adapted to be operated by actuation of the slide in response to the force applying means, said force applying means consisting of a cam and a force exerting rider operative against the cam, said cam having a straight extension substantially parallel to the slide and against which the rider can move, and spring means associated with the manually operated member for initially moving the slide to position the cam in force effecting position with respect to the rider, said second cam provided with an extension, and a rider carried by the means between the brake operating means and the second cam adapted to ride the extension when the manually operated member is beyond brake controlling position, and to ride the second cam when the member is released to brake operating position.

16. A brake control comprising a manually operated member, brake operating means, tensioning means adapted to effect operation of the brake operating means upon relief of force from the manually operated member, said tensioning means including a slide, a cam on the slide, force applying means operative against the cam, said force applying means consisting of a plunger having a roller operative against the cam and spring means exerting force against the plunger, a barrel for the plunger, and anti-frictional rollers between the wall of the barrel and the plunger.

17. A brake control comprising a manually operated member, brake operating means, drive means adapted to effect operation of the brake operating means upon relief of force from the manually operated member, said drive means including a cam against which the force of the drive means is exerted, said cam having a straight extension against which the drive means exerts itself when the manually operated member is operated to a position beyond brake controlling position.

WILLIAM J. SMITH.